L. H. SPARKS.
IGNITION CUT-OUT AND TRANSMISSION LOCK.
APPLICATION FILED APR. 30, 1913.

1,237,113.

Patented Aug. 14, 1917.
4 SHEETS—SHEET 1.

Witnesses

Inventor
L. H. Sparks
By
Attorney

L. H. SPARKS.
IGNITION CUT-OUT AND TRANSMISSION LOCK.
APPLICATION FILED APR. 30, 1913.
1,237,113.
Patented Aug. 14, 1917.
4 SHEETS—SHEET 2.
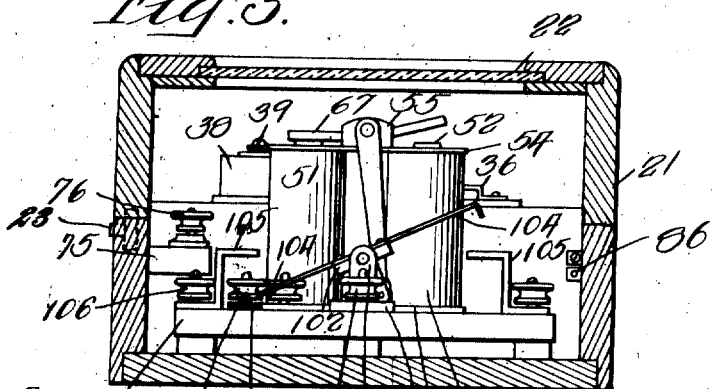
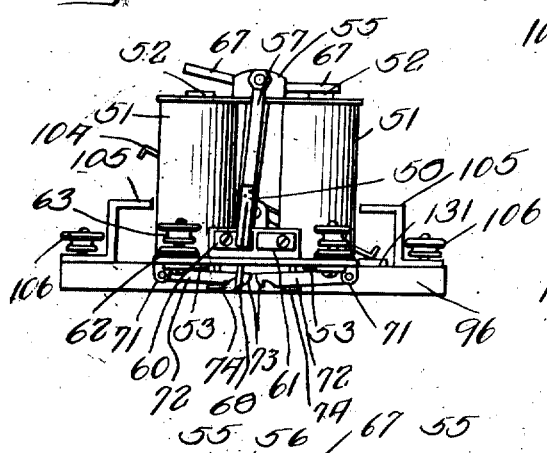
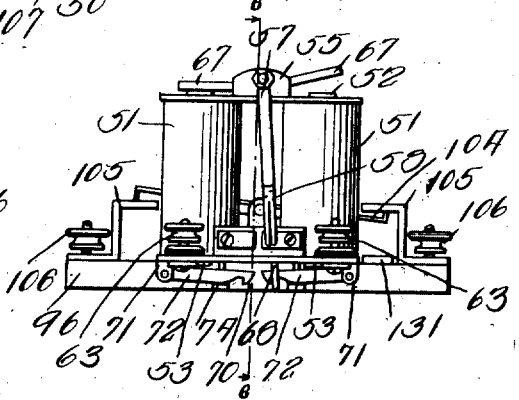
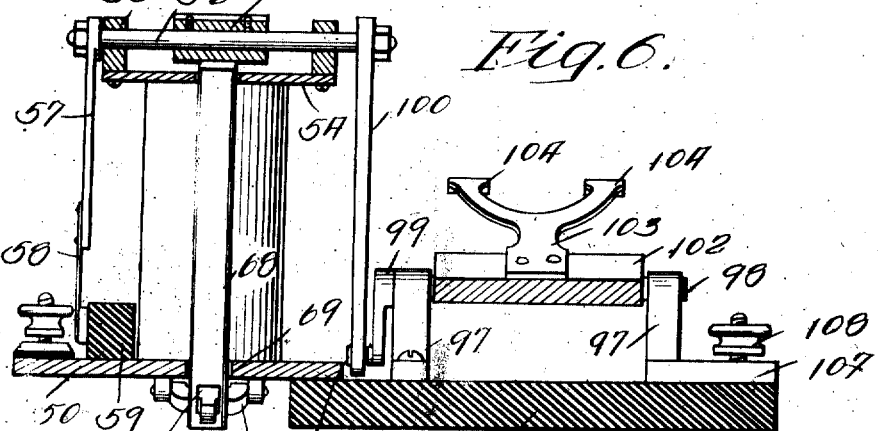
Witnesses
Inventor
L. H. Sparks
By
Attorneys

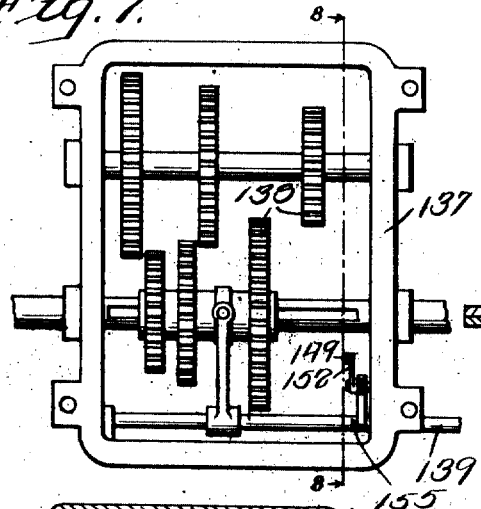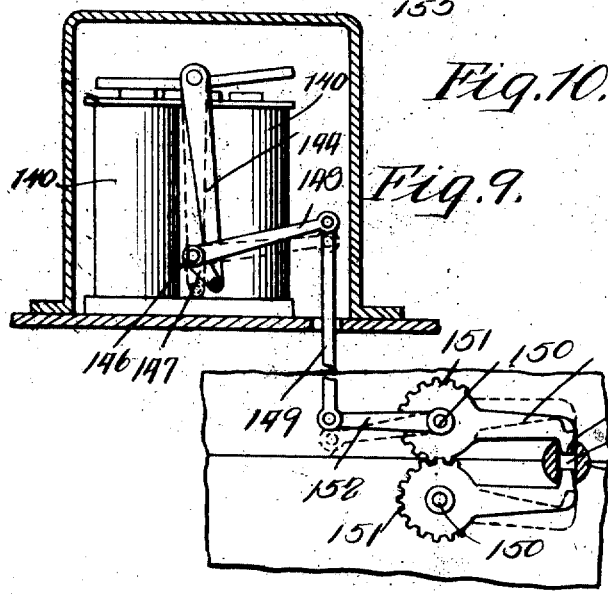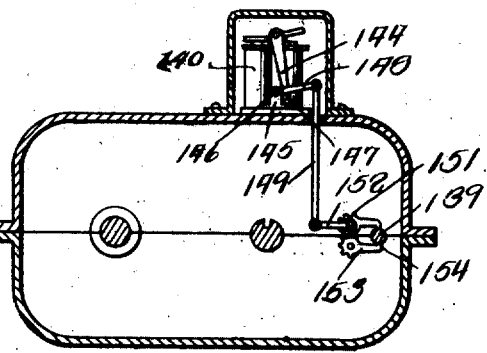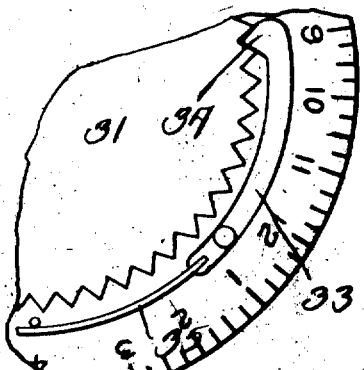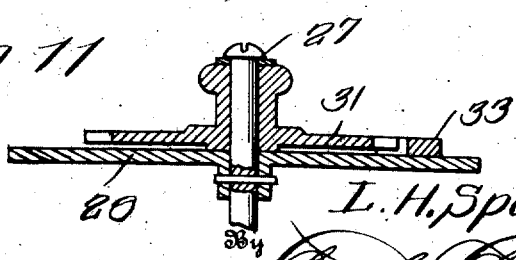

L. H. SPARKS.
IGNITION CUT-OUT AND TRANSMISSION LOCK.
APPLICATION FILED APR. 30, 1913.

1,237,113.

Patented Aug. 14, 1917.
4 SHEETS—SHEET 4.

UNITED STATES PATENT OFFICE.

LESTER H. SPARKS, OF LAKEWOOD, NEW JERSEY, ASSIGNOR TO JENNIE I. MILLER, OF LAKEWOOD, NEW JERSEY.

IGNITION CUT-OUT AND TRANSMISSION-LOCK.

1,237,113.      Specification of Letters Patent.      Patented Aug. 14, 1917.

Application filed April 30, 1913. Serial No. 764,632.

*To all whom it may concern:*

Be it known that I, LESTER H. SPARKS, a citizen of the United States, residing at Lakewood, in the county of Ocean, State of New Jersey, have invented certain new and useful Improvements in Ignition Cut-Outs and Transmission-Locks; and I do hereby declare the following to be a full, clear, and exact description of the invention, such as will enable others skilled in the art to which it appertains to make and use the same.

This invention relates to internal combustion engines and especially to a device for controlling the operation of such engines. Specially the invention relates to a device arranged to cut out or in the ignition, gear shifting mechanism and lighting system of automobile and boat motors at predetermined times.

One object of the invention is to provide a novel and improved device of the character set forth and for the purpose specified.

A second object of the invention is to provide an improved time controlled switch for controlling the operation of such a device.

A third object of the invention is to provide an improved electrically controlled switch for closing and opening certain circuits in a device of the kind described.

A fourth object of the invention is to provide an improved controlling device for use with such a switch.

A fifth object of the invention is to provide an improved electrically controlled lock for holding the gear shifting mechanism common in such motors for movement into operative position.

With the above and other objects in view the invention consists in general of certain novel details of construction and combination of parts hereinafter fully described, illustrated in the accompanying drawings, and specifically claimed.

In the accompanying drawings, like characters of reference indicate like parts in the several views, and:—

Fig. 3 is a section on the line 3—3 of Fig. 2.

Fig. 4 is a section on the line 4—4 of Fig. 2, certain parts being shown in one position.

Fig. 5 is a view similar to Fig. 4 with the parts in another position.

Fig. 6 is an enlarged detail section on the line 6—6 of Fig. 5.

Fig. 7 is a section through a transmission gear case showing the locking device applied to the transmission controlling mechanism.

Fig. 8 is a section on the line 8—8 of Fig. 7.

Fig. 9 is an enlarged detail of the lock.

Fig. 10 is an enlarged detail of the setting pawl for the time mechanisms.

Fig. 11 is an enlarged detail through the center of one of the time disks.

Figures 1, 2:
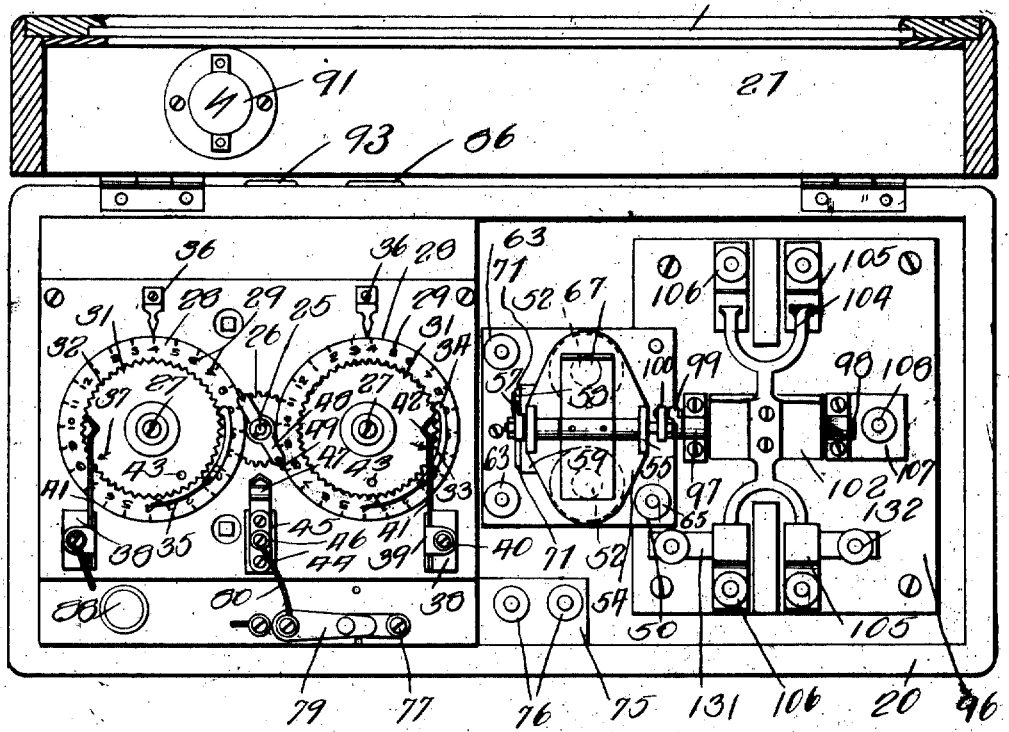
Figure 1 is a plan view of an apparatus constructed in accordance with this invention, the casing being shown open and with the top partly broken away and in section.
Fig. 2 is a side elevation of the device, the casing being in section to better disclose the interior.

In carrying out the objects of this invention there is provided a suitable casing 20 to which is securely hinged a top 21 having a glass panel 22 fixed therein in such manner as to only be removable when the top is open. This top is normally held closed by means of a suitable lock 23 which is of some one of the well known types which are practically proof against picking. Within the casing is located the time device and the switch controlled thereby so that these devices cannot be tampered with by an unauthorized person.

The timing device is actuated by any suitable clock movement located within a case 24 situated at one end of the casing 20. This clock movement is not deemed necessary to be herein shown as its specific features form no part of the invention and it is to be understood as represented typically by the case 24. The clock movement is provided with the arbor 25 arranged to rotate twice every hour and on this arbor is fixed a pinion 26. Spaced on opposite sides of the arbor 25 are arbors 27 secured to the upper part of the case 24. On the arbors 27 are mounted hour disks 28 which are divided to represent twenty four hours and suitably marked therefor as at 29. The indicia on each of these disks consists of the numbers "1" to "12" repeated twice, one of said sets of numbers indicating the hours from 1 p. m. to 12 midnight and the other set the hours from 1 a. m. to noon, the two sets being distinguished by differences in color or in any desired manner. The spaces between successive hour markings are suitably divided to indicate fractions of an hour, here shown as quarters and halves. Each of the hour disks has connected thereto a gear 30 which is geared to the clock work and the ratio of movement of the gears 30 and pinion 26 is such that forty eight revolutions of the pinion take place during one revolution of each gear and its corresponding disk.

Revolubly mounted on each of the arbors 27 are setting disks 31 each provided with a peripheral series of V-shaped teeth 32. Pivoted on each of the disks 28 is a pawl 33 having a V-shaped offset end 34 arranged to engage between adjacent teeth 32 so that, when thus engaged the disks 31 will move with the disks 28. These pawls are constantly held in engagement with the disks 31 by means of springs 35 but the shape of the teeth and pawl ends is such that the disks 31 may be manually turned on the disks 28. Adjacent each disk 28 is a pointer 36 which serves to indicate the time in the manner common in those clocks wherein a disk takes the place of the hands and a pointer is used instead of the usual hour circle. By this means it may be seen whether the clock work is set correctly. On each of the disks 31 is an arrow 37 and these arrows are used to set the disks 31 to the desired hours for stopping and permitting the operation of the machine which is controlled by this device, this being accomplished by moving the disks 31 relative to the disks 28 until the arrows 37 point to the respective stopping and starting hours, the expressions "stopping" and "starting" being used herein in the sense of indicating that hour at which it is desired that the machine shall cease to operate and that hour after which the machine may be operated respectively.

Mounted near each of the disks 31 is an insulating block 38 whereon is mounted a metallic plate 39 carrying a binding screw
40. Each of these plates is in contact with a spring contact arm 41 extending over the respective disk 31 and on each arm is a V-shaped projection 42. Extending upward from each of the disks 31 is a pin 43 which revolves about the respective arbor 27 in a path intersecting the respective end 42 so that as the disks 31 are rotated these pins will contact with the contact arms 41.

Mounted on the case 24 is an insulating block 44 whereto is secured a metallic plate 45 provided with the binding screw 46 and carrying a contact arm 47. On the arbor 25 is fixed a double arm contact member 48 carrying at the end of each arm a contact 49 which engages with the contact arm 47 as the arbor rotates. It is to be particularly noted that the pins 43 and contacts 49 are at all times in electrical connection through the clock work and case 24. It is further to be noted that the pins 43 are angularly displaced about the arbors 27 with reference to the arrows 37 in such manner that when an arrow is opposite a pointer 36 the respective pin will contact with its arm end 42.

Finally the arrangement of the member 48 is such that the engagement of the contact 47 with one of the contacts 49 takes place at the time the arrow and pointer are exactly in line. It will be understood that the relatively slow movement of the disks 31 would preclude accurate working of the instrument while the rapidly moving member 48 not only permits accurate timing but also breaks connection between the parts 47 and 49 shortly after being made and thereby minimizes the consumption of any current which may be flowing through these parts.

The magnetic control for the switch used with the device will now be described. Within the casing 20 is mounted a metallic base 50 whereto is secured a pair of electromagnets 51 having cores 52 which extend slightly below the base 50 as at 53. Secured to the tops of these magnets is a plate 54 whereon are mounted bearings 55. Through these bearings extends a shaft 56 and on one end of this shaft is mounted a downwardly extending arm 57 carrying on its lower end a contact spring 58. Adjacent the lower ends of the magnets is an insulating block 59 which is secured to the base 50. On the block 59 is mounted a pair of spaced contacts 60 each being connected by a wire 61 (see Fig. 12) with one end of the winding of a respective magnet 51. On the plate 50 is mounted a pair of spaced insulating blocks 62 whereon are supported binding posts 63. The remaining ends of the magnet windings are each connected to a respective binding post by a wire 64 (see Fig. 12). On the plate 50 is a binding post 65 which is connected directly to the plate and, as the arm 57 is in electrical connection with the plate through the shaft, bearings and other parts, this post 65 is in connection with the arm, the connection being shown in the diagram at 66.

Carried by the shaft 56 is a pair of armatures 67 disposed at an angle and so arranged that when one of these armatures is attracted by its magnet the remaining armature will move away from its magnet. Depending from the shaft 56 is a latch lever 68 projecting below the plate 50 through a suitable opening 69 and having adjacent its lower end an opening 70. Mounted at the sides of the plate 50 and depending therefrom are pairs of ears 71 whereto are pivotally connected armatures 72 each having at its free end a hook 73 which is adapted to enter the opening 70 and releasably hold the lever 68 so that, when the magnets are deënergized the lever cannot be shifted by jarring the casing. These armatures are limited in their downward movement by suitable stops 74 carried by the plate 50.

In order to understand the operation of the device as thus far described it will now be necessary to refer to a portion of the wiring and its connections.

Figure 12:
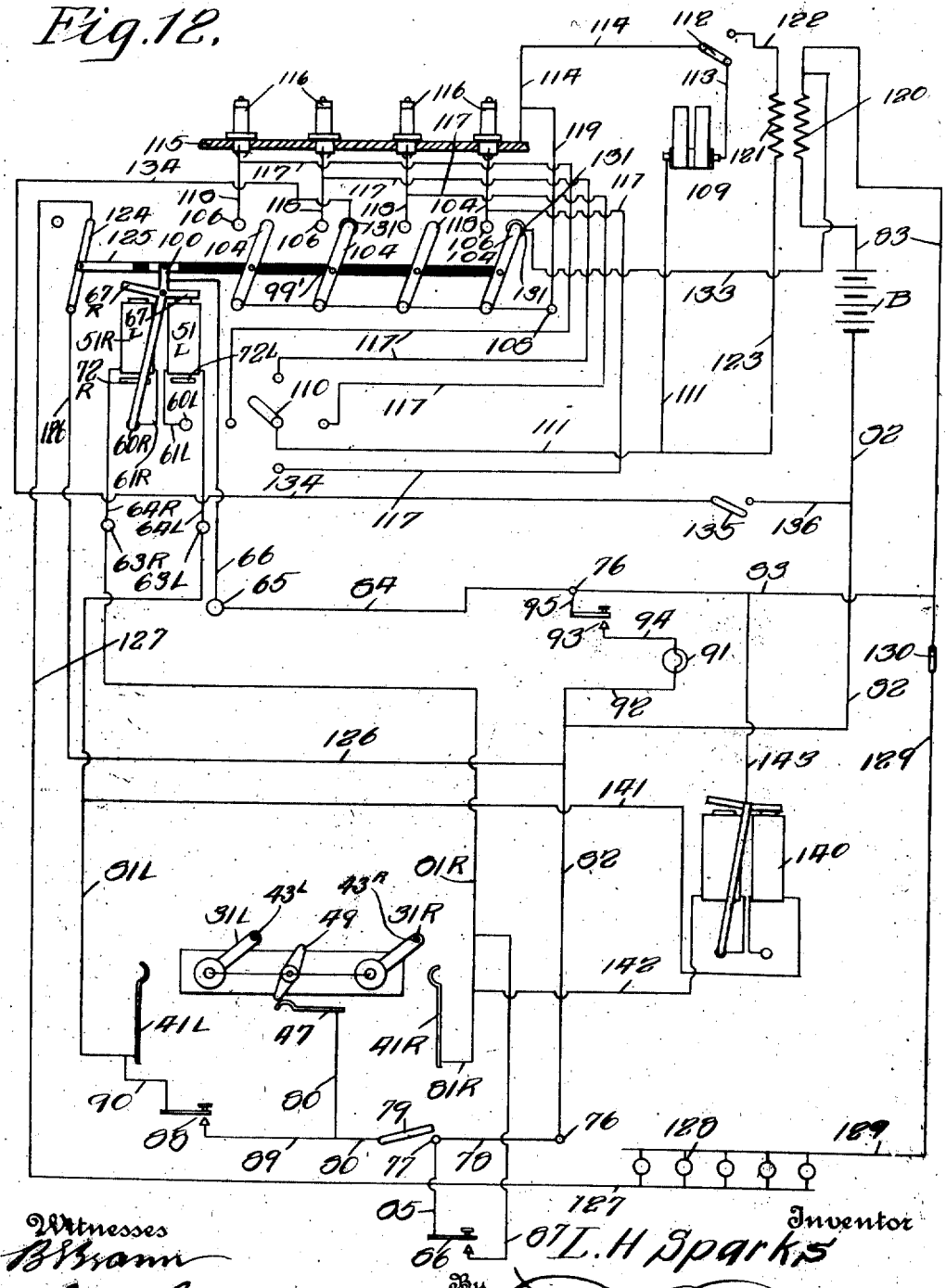
Fig. 12 is a diagram showing the wiring used.

Within the casing 20 is an insulating block 75 whereon are mounted the binding posts 76. On this block 75 is a contact 77 which is connected by a wire 78 with one of the posts 76, as in Fig. 12. Pivoted on the block 75 is a switch arm 79 which is adapted to engage the contact 77 when in one position. A wire 80 connects this switch arm with the contact 47. From each of the contact arms 41 extends a wire 81 which as shown in Fig. 12, connects to a respective binding post 63. This apparatus is connected to the battery B of the motor by wires 82 and 83 which lead from said battery to the respective binding posts 76, the second post 76 being connected by a wire 84 with the post 65, as shown in Fig. 12.

The part of the mechanism just described forms the time controlled circuit closer and the electro-magnetic switch operating device and its operation is as follows, it being understood that the left hand disk 31 (represented with its pin as an arm in the diagram) is the stopping disk and the right hand disk the starting disk. It will be noted that the various wires, contacts, posts and other parts in circuit with the respective disks or controlled thereby will be indicated when necessary to distinguish the same by adding the letters R and L to the respective reference numerals. This being done in tracing the circuits in this specification and in the wiring diagram only, the construction figures of the drawing having the suffixes omitted as is also done in the description of such figures.

The two disks are set, as hereinbefore described to the desired hours for starting and stopping, and for the sake of example suppose these hours to be 8 a. m. and 11 p. m. respectively, these being the hours shown in Fig. 1. Now assuming the present hour to be 7 a. m. the motor will be out of service. At 8 a. m. the pin 43L will contact with the arm 41L and one of the contacts 49 will engage the contact 47. A circuit will then be completed from the battery B, through wire 82, post 76, wire 78, contact 77, switch 79, wire 80, contact 47, contact 49, case 24, disk 31L, pin 43L, arm 41L, wire 81L, post 63L, wire 64L, magnet 51L, wire 61L, contact 60L, arm 57, connection 66, post 65, wire 84, post 76 and wire 83 back to the battery B. Thereupon the magnet 51L will be energized and the armatures 67L and 72L attracted to the core 52L. Movement of the armature 72 will unlock the latch lever 68 and permit movement of the arm 57 to the right. Thereupon this circuit will be broken by reason of movement of the contact 58 off of the contact 60L but the attraction of the magnet is sufficient to swing the arm 57 to such position that the contact 58 will engage the contact 60R, thus setting this part of the device for the next step. At the same time the hook 73R engages the arms 68 and holds it from moving to the right until properly released, the parts being left in the position shown in the diagram. Now these parts will remain in this position (unless shifted by an auxiliary device to be described) until 11 p. m. when the disk 31R will close its circuit in the same manner as before except that the current will flow through a circuit established from the battery B through the wire 82, post 76, wire 78, contact 77, switch 79, wire 80, contact 47, contact 49, case 24, disk 31R, pin 43R, arm 41R, wire 81R, post 63R, wire 64R, magnet 51R, wire 61R, contact 60R, arm 57, connection 66, post 65, wire 84, post 76 and wire 83 back to the battery B. The magnet 51R will now be energized and the arm 57 moved to the right.

In order to place the stopping of the motor under control of the owner or operator independently of the time controlled circuit closer the contact 77 is connected by a wire 85 with a push button 86 located on the exterior of the casing 20, and the wire 81R is also connected to this push button by a wire 87. By this means electrical connection may be established at will from the contact 77 to the wire 81R and the magnet 51R energized.

In like manner the starting circuit can be closed by means of a push button 88 connected by a wire 89 with the wire 81 and by a wire 90 with the wire 81L. This push button, however is located within the casing so that access thereto can only be had by opening the casing thus preventing unauthorized persons from moving the arm 57 to the starting position.

For the purpose of lighting the disks at night a lamp 91 is fitted inside the casing adjacent said disks and is connected to the wire 82 by a wire 92. Adjacent the push button 86 on the outside of the casing is a push button 93 connected by a wire 94 with the lamp 91 and by a wire 95 with the post 76. Since the post 76 is connected to the wire 83 a circuit will be established through the lamp when the push button is pressed as can readily be seen by reference to Fig. 12.

Considering now the switch used to control the spark plugs.

Within the casing 20 is a plate 96 of insulating material whereon are mounted spaced bearings 97. Journaled in the bearings is a shaft 98 and to one end of this shaft 56 is mounted an arm 100 which has a suitable pin and slot connection 101 so that movement of the shaft 56 causes similar movement of the shaft 98. This shaft 98 is provided with a flat central portion 102 whereto is secured a double armed lever 103 having forked branches forming extremities 104. Secured to the plate 96 in the paths of these extremities 104 are Z-shaped contacts 105 each provided with a binding screw 106. One of the bearings 97 is provided with an extended foot 107 whereon is mounted a binding post 108. In order to bring out these features in the diagram the parts 104 and 106 have been indicated as switches and the lever 99 is replaced by a connecting bar 99'. By means of the above construction the extremities 104 are at all times in electrical connection with the post 108.

In connection with this switch there is employed the usual magneto 109 which is connected to the timer 110 by a wire 111. At 112 is a two point switch which has one of its points connected to the magneto by a wire 113. This switch is also connected to the engine frame by a wire 114, said frame being indicated at 115. The usual spark plugs 116 are employed and each of these spark plugs is connected to one of the timer contacts by a wire 117. Each of these wires 117 is connected to a contact 106 by a wire 118 and the post 108 is connected to the wire 114 by a wire 119. Connected in on the wire 83 is the primary 120 of a spark coil, the secondary of said coil being indicated at 121. This secondary is connected to the remaining point of the switch 112 by a wire 122 and to the wire 111 by a wire 123. It will now be plain from an inspection of Fig. 12 that, with the parts as shown, current will flow from the magneto 109, through the wire 111, timer 110, wires 117, spark plugs 116, wire 114, switch 112 and wire 113 back to the magneto. It will be obvious that the magneto may be cut out of this circuit and the secondary 121 cut in by shifting the switch 112. When the parts are shifted to stopping position current will not flow through the plugs because a short circuit will be established from the magneto 109, through wire 111, wires 117, wires 118, contacts 106, arms 104, post 108, wire 119, wire 114, switch 112, and wire 113 back to the magneto 109. The secondary can of course take the place of the magneto as previously described.

For the purpose of controlling the lighting circuit common to such machines a switch 124 is employed. The movement of this switch is controlled by an arm 125 operated by the lever 100. This switch is connected by a wire 126 to the wire 82 and by a wire 127 to the lamps 128. From these lamps extends a wire 129 which is connected to the wire 83. The switch 124 is so arranged that when the parts are in starting position the switch is closed and the lamps are lighted unless cut out by the manually operable switch 130.

When the parts are in the position shown in Fig. 12 the terminals 104 contact with plates 131 mounted on the base 96 and provided with binding posts 132. One of these plates is connected to the wire 83 by a wire 133 and the other plate is connected by a wire 134 with a switch 135 which is in turn connected to the wire 82 by a wire 136. This circuit will thus be opened when the circuit through the spark plugs is short circuited as above described.

In order to lock the change gears in neutral position so that the motor is thrown out of connection with the driving wheels the following apparatus is employed. At 137 is indicated the change gear casing containing the gearing, 138. Certain of the gears are shiftable in the usual manner by the rod 139. Mounted on the casing 137 is a pair of magnets 140 which are precisely similar in all respects with the magnets 51 and are similarly equipped. These magnets 140 are connected in multiple with the magnets 51 by wires 141 and 142 connecting respectively to the wires 81L and 81R. The magnets 140 are also connected to the wire 83 by a wire 143 and are provided with an arm 144 corresponding to the arm 100. By reason of the identity of construction this arm 144 will move in unison with the arm 100. Mounted in suitable bearings 145 is a rock shaft 146 carrying the rock arms 147 and 148. The arm 147 is connected to the arm 144 and the arm 148 has connected thereto a link 149. Journaled within the casing 137 is a pair of shafts 150 whereon are mounted the meshing segmental gears 151. One of these shafts has secured thereto an arm 152 which is connected to the lower end of the link 149 and each of the gears is provided with an arm 153 at the end of which is a lug 154 adapted to enter an opening 155 in the rod 139.

In the operation of this part of the device it will be noted that, since the arms 100 and 144 work in unison the lugs 154 will be moved to engage in the opening 155 at the time the current through the spark plug is short circuited so that upon moving the rod 139 to neutral position (see Fig. 7) the lugs will enter said opening and lock the rod from movement.

The different operations having been described in detail it is not deemed necessary to again describe the same but it is desired to call attention to the fact that by means of this apparatus control is provided for the sparking arrangement, the lighting system, and the gear shifting mechanism.

There has thus been provided a simple and efficient device of the kind described, and of the character specified.

It will be obvious that many minor changes may be made in the form and construction of this invention without departing from the material principles thereof. It is not therefore desired to confine the invention to the exact form herein shown and described, but it is wished to include all such as come properly within the scope claimed.

Having thus described the invention, what is claimed as new, is:—

1. In a time-controlled circuit closer, a clock work mechanism including a pair of revoluble arbors in electrical communication, disks having contact members thereon mounted on said arbors and arranged to rotate therewith, stationary contact members located in the paths of movement of the contact members on the disk, each of said stationary contact members being connected to one end of an open circuit, the disks being adjustable on the arbors so that the time of contact between the contact members thereon and the stationary contact members may be varied, a third arbor mounted on the clock-work mechanism and rotatable with the first mentioned arbors, said third arbor having a pair of contacts thereon in electrical communication with the contacts on the aforementioned arbors, a wire common to both the aforementioned circuits and forming the other end of each and a contact member on the end of said wire mounted in the path of movement of the contact on the third arbor, the contacts on the third arbor being arranged to engage the adjacent stationary contact member upon the engagement of the contacts on the first mentioned arbors with the adjacent stationary contact members.

2. In a time-controlled circuit closer, a clock-work mechanism including a pair of revoluble arbors in electrical communication, disks having contact members thereon mounted on said arbors and arranged to rotate therewith, stationary contact members located in the paths of movement of the contact members on the disks, each being connected to one end of an open circuit, the said stationary contact members each being connected to one open end of an electrical circuit, the disks being independently adjustable on the arbors whereby the time of contact between the contact members on the disks and the stationary contact members may be independently varied, a clock-work mechanism for rotating the arbors and a third arbor mounted on the clock-work mechanism and rotatable with the first mentioned arbors, said third arbor having a pair of contacts thereon in electrical communication with the contacts on the aforementioned arbors, a wire common to both the aforementioned circuits and forming the other end of each, and a contact member on the end of said wire mounted in the path of movement of the contact on the third arbor, the contacts on the third arbor being arranged to engage the adjacent stationary contact member upon the engagement of the contacts on the first mentioned arbors with the adjacent stationary contact members.

3. In a circuit closer of the class described, a pair of spaced arbors, a pair of disks mounted on said arbors and having time indicia thereon, other disks mounted on said arbors and revoluble with relation to the first disks, means to hold said disk in adjusted relation. a contact member fixed to each of the second disks, said members being in electrical communication, stationary contact members in the paths of the last mentioned contact members, a third arbor, contact members carried thereby, a stationary contact member in the path of movement of the contact on the third arbor and a clockwork mechanism for rotating all of said arbors so that the contact members on the first mentioned arbor will engage the adjacent stationary contact and one of the contact members on the third arbor will engage the adjacent stationary contact simultaneously with the engagement of either of the contact members on the first arbors with the adjacent stationary contacts.

4. In a circuit closer of the class described, a pair of spaced arbors, a pair of disks mounted on said arbors and having time indicia thereon, other disks mounted on said arbors and revoluble with reference to the first disks, means to hold said disks in adjusted relation, a contact member fixed to each of the second disks, said member being in electrical communication with one of the disks, stationary contact members in the paths of the last mentioned members, a third arbor, a contact arm carried by the third arbor, a stationary contact in the path of said arm, said last mentioned stationary contact being adapted for connection to a line wire and the remaining stationary contacts being adapted for connection to branch wires, and a clock work for rotating said arbors.

In testimony whereof, I affix my signature, in the presence of two witnesses.

LESTER H. SPARKS.

Witnesses:
 W. G. WEDEMEYER,
 ED A. TICKNEP.